Patented Mar. 9, 1948

UNITED STATES PATENT OFFICE 2,437,519

MANUFACTURE OF ANHYDROUS ALIPHATIC ACIDS FROM AQUEOUS SOLUTIONS THEREOF

Henri Martin Guinot, Versailles, and Pierre Chassaing, Melle, France, assignors to Les Usines De Melle (Societe Anonyme) Saint-Leger-les-Melle, France, a company of France No Drawing. Application March 17, 1945, Serial No. 583,375. In France January 13, 1943

Section 1, Public Law 690, August 8, 1946
Patent expires January 13, 1963

8 Claims. (Cl. 260—540)

It is known that lower aliphatic acids can be obtained in anhydrous condition from diluted aqueous solutions thereof, by extraction with solvents followed by azeotropic distillation of extract. A variety of materials (ethers, esters, ketones, hydrocarbons and so on) have been proposed as extracting media. A drawback common to all of them, without any exception is that their extraction coefficient diminishes as the concentration of acid in the solution to be extracted becomes lower, thereby leading in actual practice to a multiplicity of extraction devices for materials of low acid content and frequently necessitating, in spite of repeated extractions, the leaving in the waste waters of substantial amounts of acid which are thereby lost.

It is an object of our invention to avoid the aforesaid drawback. According to this invention, we use tetrahydrofurane or its derivatives such as 2-methyl-tetrahydrofurane, 2:2-diethyl-tetrahydrofurane, 2:2:5:5-tetramethyl-tetrahydrofurane and the like as extraction agents. As a matter of fact, we have found that the above substances, besides being excellent solvents for aliphatic acids, exhibit the unexpected property of having higher extraction coefficients as the acid content in the aqueous layer becomes lower. Thus, in the extracting of acetic acid with methyl-tetrahydrofurane, the extraction coefficients are respectively 1.42, 1.76 and 2.30 for the following acetic acid contents in the aqueous layer: 86.4 g. per litre, 54 g. per litre and 6 g. per litre. It should be remarked that the smallest extraction coefficient, i. e., 1.42, exceeds by nearly 50 per cent the coefficient of extraction of the best solvents known prior to this time (acetic esters, acetone and the like).

Likewise, in the case of formic acid, the extraction coefficient of 2-methyl-tetrahydrofurane, which is 1.04 for an acid content of 150 g. per litre in the aqueous layer, rises to 1.31 for an acid content of 65 g. per litre in the aqueous layer and reaches 1.62 for a content of 7 g. per litre. Again, the coefficients are far higher than those of the best previously known solvents.

This precious property enables of substantial lowering of the number of units in the extraction battery and a decreasing of their dimensions, while providing for a practically perfect removal of the material to be extracted from the waste waters.

Tetrahydrofurane derivatives possess relatively low boiling points ranging from 77° C. for methyl-tetrahydrofurane to 107° C. for 2:2:5:5-tetramethyl-tetrahydrofurane. In consideration of these boiling points, we may select for a given acid, a solvent having a suitable boiling point and adapted to be separated easily from anhydrous acid during subsequent distillation of the extract.

It is within the scope of our invention to add to the solvent an amount of a third substance, practically insoluble in water, for instance a hydrocarbon, to reduce the amount of water dissolved in the aqueous layer of solvent and acid and thus to increase the concentration of extracted acid and also to reduce the solubility of the solvent in the aqueous layer, especially in the instance of tetrahydrofurane itself. A hydrocarbon having a boiling point very close to that of the tetrahydrofurane solvent is preferred. This causes the mixture to behave like a pure substance during the distillation of the extract. Thus mixtures of tetrahydrofurane or methyltetrahydrofurane with benzene, and tetra-methyl-tetrahydrofurane with toluene may be used.

The extract obtained is treated according to any known method for recovering therefrom its acid content in anhydrous condition. It may be subjected, for instance, to a distillation during which azeotropic dehydration of the extract takes place with the solvent playing the part of a water entrainer and being separated from anhydrous acid. In other words, we can obtain the binary azeotropic mixture from the top of the distillation column so as to provide for an easy decantation, which allows of discarding water on the one hand and recovering solvent on the other hand.

However, it is still within the scope of this invention to effect azeotropic distillation in the presence of an insoluble auxiliary entrainer adapted to ensure a satisfactory decantation, even with volatile products, according to the method described in the U. S. patent applications Ser. No. 319,762, filed February 19, 1940, and Ser. No. 373,689, filed January 8, 1941.

It should be remarked that our invention is applicable to the dehydration of aqueous solutions of mono-carboxylic or polycarboxylic aliphatic acids which may contain substituents, for example, aqueous solutions containing formic acid or its higher homologues, cyanacetic acid, lactic acid, oxalic acid, citric acid or the like.

The following examples which have no limitative character will show a manner of carrying out our invention.

*Example 1.*—To obtain anhydrous acetic acid from a 25 per cent aqueous solution thereof, the solution was treated in a cold state with 2-methyl-tetrahydro-furane in a counter-current extraction battery, 1.5 volumes of solvent being used for 1 volume of solution to be extracted.

Ten extraction units in the battery were sufficient to extract said acid completely from its aqueous solution. The extract from the battery contained 167 g. of acetic acid per litre.

The solution of acetic acid in methyl-tetra-hydro-furane was dehydrated by azeotropic distillation in a column, methyl-tetrahydro-furane playing the part of a water entrainer while anhydrous acid was withdrawn from the bottom of the column.

By way of comparison, in order to treat the same solution with like efficiency by means of ethyl acetate as a solvent, it would be necessary to use a 16 unit battery and to employ 2.5 volumes of solvent per volume of solution. Moreover, under such conditions, the extract from the battery would contain no more than 100 g. of acid per litre.

*Example 2.*—We started with a 15 per cent aqueous solution of formic acid containing impurities such as cellulosic wastes and inorganic salts.

The solution was treated with 1.5 times its volume of methyl-tetrahydro-furane in a counter-current battery adapted for methodic extraction. Twelve extraction units were sufficient to transfer the whole acid content into the solvent, the waste waters from the battery being completely de-acidified so that they could be thrown away.

The extract contained 100 g. of acid per litre.

It was treated in known fashion for recovery of anhydrous acid therefrom.

By way of comparison the use of sulphuric ether would require 36 elements for extraction of the same solution, i. e., three times more than in the case of methyl-tetrahydrofurane, 4 volumes of ether being employed per volume of formic solution, that is almost three times more solvent than in the case of methyl-tetrahydrofurane.

*Example 3.*—We extracted cyanacetic acid from a 15 per cent aqueous solution thereof. 2:2:5:5-tetramethyl-tetrahydrofurane, having an extraction coefficient from 2.4 to 3.5 for concentrations of 150 to 8.5 g. per litre in the aqueous solution, was used as a solvent.

In a 4 unit extraction battery, the aqueous solution was treated with an equal volume of 2:2:5:5-tetramethyl-tetrahydrofurane. We thus recovered 99.85 per cent of the cyanacetic acid originally present in the solution. The extracted acid had a concentration of 40.7 per cent.

Tetramethyl-tetrahydrofurane, which has a boiling point of 115° C., was used as a water entrainer for subsequent azeotropic dehydration of the extract.

It is within the scope of our invention to deal with aqueous solutions containing mixtures of aliphatic acids, the acids being separated from one another by isolation from their anhydrous mixture.

*Example 4.*—We started from an aceto-butyric fermentation wort with a total acid content of 2 per cent, two thirds being butyric acid and one third acetic acid.

2:2-dimethyl-tetrahydrofurane having a remarkably high extraction coefficient (above 3) in spite of the low acid content in the wort to be extracted, was used as a solvent.

Under these conditions, 0.5 volume of solvent per volume of solution to be extracted was sufficient to recover 99.75 per cent of the acids originally present in the wort, in a 11 unit extraction battery.

Extracted acid was then dehydrated according to usual methods. In this process, 2:2-dimethyl-tetrahydrofurane which has a boiling point of 90-92° C. plays the part of a water entrainer. The mixture of anhydrous acids thus obtained was split into its elements through rectification.

It is within the scope of our invention to work at subatmospheric or superatmospheric pressure.

What we claim is:

1. A method for concentrating an aqueous solution of a lower carboxylic aliphatic acid, which comprises extracting said solution with a solvent which is a compound of the group consisting of tetrahydrofurane, methyl-substituted tetrahydrofuranes and ethyl-substituted tetrahydrofuranes.

2. A method for concentrating an aqueous solution of a lower carboxylic aliphatic acid, which comprises extracting said solution with a solvent which is a compound of the group consisting of tetrahydrofurane, methyl-substituted tetrahydrofuranes and ethyl-substituted tetrahydrofuranes and a hydrocarbon having a boiling point equal to or substantially equal to the boiling point of said solvent.

3. A method for dehydrating an aqueous solution of at least one lower carboxylic aliphatic acid, which comprises extracting said solution with a solvent which is a compound of the group consisting of tetrahydrofurane, methyl-substituted tetrahydrofuranes and ethyl-substituted tetrahydrofuranes; distilling said extract in a distillation zone to produce vapours of an azeotrope containing water and said solvent; condensing said vapours to obtain a two layer liquid, one layer being an aqueous layer while the other is a solvent layer; and returning the solvent layer to the distillation zone.

4. A method for recovering separately in anhydrous condition at least two lower carboxylic aliphatic acids from an aqueous solution thereof, which comprises extracting said solution with a solvent including tetrahydrofurane; dehydrating the extract thus obtained to produce an anhydrous mixture of said acids; and splitting said anhydrous mixture into its components.

5. The method of claim 4, the dehydrating step comprising distilling said extract in a distillation zone to produce vapours of an azeotrope containing water and said solvent; condensing said vapours to obtain a two layer liquid, one layer being an aqueous layer, while the other is a solvent layer; and returning the latter layer to the distillation zone.

6. The method of claim 1, the compound being 2-methyl-tetrahydro-furane.

7. The method of claim 1, the compound being 2:2-dimethyl-tetrahydro-furane.

8. The method of claim 2, the compound being tetrahydro-furane and the hydrocarbon being benzene.

HENRI MARTIN GUINOT.
PIERRE CHASSAING.

REFERENCES CITED

The following references are of record in the file of this patent:

UNITED STATES PATENTS

| Number | Name | Date |
|---|---|---|
| 2,028,800 | Othmer | Jan. 28, 1936 |
| 2,033,292 | Lazier | Mar. 10, 1936 |
| 2,041,668 | Wentworth | May 19, 1936 |
| 2,107,527 | Evans et al. | Feb. 8, 1938 |
| 2,255,235 | Wentworth | Sept. 9, 1941 |
| 2,360,862 | Morris et al. | Oct. 24, 1944 |
| 2,366,464 | Wilson | Jan. 2, 1945 |

FOREIGN PATENTS

| Number | Country | Date |
|---|---|---|
| 453,928 | Belgium | Sept. 19, 1945 |